United States Patent [19]

Tanaka et al.

[11] Patent Number: 4,668,065

[45] Date of Patent: May 26, 1987

[54] SHOCK ABSORBING DEVICE OF A SINGLE LENS REFLEX CAMERA

[75] Inventors: Etsuo Tanaka; Yoshiaki Tanabe, both of Tokyo, Japan

[73] Assignee: Nippon Kogaku K. K., Tokyo, Japan

[21] Appl. No.: 753,542

[22] Filed: Jul. 10, 1985

[30] Foreign Application Priority Data

Jul. 24, 1984 [JP] Japan ................................ 59-153381

[51] Int. Cl.$^4$ ......................................... G03B 19/14
[52] U.S. Cl. .................................................. 354/152
[58] Field of Search ............... 354/153, 154, 156, 150, 354/151, 152, 155

[56] References Cited

U.S. PATENT DOCUMENTS

| | | | |
|---|---|---|---|
| 3,675,557 | 7/1972 | Yokozato et al. | 354/153 |
| 3,860,941 | 1/1975 | Fukuda | 354/156 |
| 4,068,246 | 1/1978 | Arai | 354/152 X |
| 4,458,998 | 7/1984 | Tanaka et al. | 354/154 |
| 4,508,439 | 4/1985 | Ohara et al. | 354/154 |

Primary Examiner—Donald A. Griffin

Attorney, Agent, or Firm—Shapiro and Shapiro

[57] ABSTRACT

A camera comprises a mirror member provided between a photo-taking lens and the focal plane thereof and having a reflecting surface and a pivot axis provided at one end of the reflecting surface in parallelism to the focal plane, the mirror member being movable from an observation position in which the reflecting surface intersects the optic axis of the photo-taking lens to a retracted position in which the reflecting surface is retracted from the optic axis, by the pivotal movement of the reflecting surface about the pivot axis, a mirror chamber for containing the mirror therein, the mirror chamber having a pair of openings forming the optical path from the photo-taking lens to the focal plane a pair of vertical side walls provided on opposite sides of and vertically to the pivot axis and a movable bottom wall in parallelism to the pivot axis, and driving means for moving the mirror member and the movable bottom wall at the same time so that the center of gravity of the movable bottom wall moves in a direction substantially opposite to the direction of the movement of the center of gravity of the mirror member.

12 Claims, 7 Drawing Figures

SHOCK ABSORBING DEVICE OF A SINGLE LENS REFLEX CAMERA

BACKGROUND OF THE INVENTION

1. Field of the Invention

This invention relates to a shock absorbing device of a single lens reflex camera, and in particular to a shock absorbing device which effectively works against vibrations caused by a mirror pivoting rapidly.

2. Description of the Prior Art

In a single lens reflex camera having a mirror pivotable between an observation position for bending the photo-taking optical path toward the finder and a retracted position in which the mirror has been retracted out of the photo-taking optical path, the camera body has heretofore been displaced in a direction opposite to the direction of the movement of the mirror as the reaction of the rapid pivoting of the mirror to cause vibrations of the camera. A device in which a counterweight is provided at the tip end of a pivotally movable lever having a center of pivotal movement near the center of pivotal movement of the mirror and having a long arm, and in which this counterweight is pivoted in a direction opposite to the direction of pivotal movement of the mirror to negate the reaction of the pivotal movement of the mirror is known from U.S. Pat. No. 3,860,941.

In this known device, however, the counterweight is designed to pivot sideways of the mirror so as not to intercept the photo-taking light beam and therefore, it is necessary that a wide space sufficient for the pivotal movement of the counterweight be provided laterally of the mirror, and this is contrary to the tendency of cameras toward compactness.

In order to eliminate such disadvantage, the inventors propose in U.S. Pat. No. 4,458,998 a shock absorbing device in which a counterweight is provided in the space between a mirror in the observation position and a film opening and the distance of movement thereof is made smaller than the distance of movement of the center of gravity of the mirror and the mass thereof is made sufficiently great by using a material of great specific gravity to thereby increase the vibration preventing effect. In the device disclosed in this prior art, the counterweight is designed to effect an arcuate movement along the bottom wall of a mirror chamber so that the counterweight is downwardly retracted out of the photo-taking optical path when the mirror is upwardly retracted out of the phototaking optical path. Accordingly, at the early stage of the movement of the mirror from the observation position, the counterweight moves in a direction opposite to the direction of movement of the mirror to thereby suppress the vibrations of the camera efficiently, whereas at the middle stage and thereafter, the counterweight moves in a direction perpendicular to the movement of the mirror so as to be along the bottom wall of the mirror chamber and therefore, it hardly suppresses the vibrations of the camera, and this leads to a disadvantage of low efficiency. Also, where the counterweight is designed to be pivoted vertically like the mirror in order to eliminate such disadvantage, extra space is required at the bottom of the mirror chamber, and this is contrary to the tendency of cameras toward compactness.

SUMMARY OF THE INVENTION

It is an object of the present invention to eliminate the above-noted disadvantages peculiar to the device according to the prior art and to provide a shock absorbing device of a single lens reflex camera which can efficiently suppress the vibrations of the camera without making the camera bulky.

In the present invention, a counterweight is provided at the bottom of a mirror chamber containing a movable mirror therein so as to be vertically displaced in synchronism with the mirror. This counterweight is connected to the mirror through an interlocking mechanism and is moved in a direction opposite to the direction of movement of the mirror. When the mirror has been moved up from the observation position to the retracted position, the counterweight is lowered to a predetermined position so as to form at least a part of the bottom wall defining the bottom of the mirror chamber.

To suppress the vibrations of the camera caused as the reaction of the upward movement of the mirror, a counterweight having a momentum matching the camera's vertical component of the momentum the mirror has during its upward movement may be displaced to the bottom of the mirror chamber in a direction opposite to the direction of movement of the mirror. The momentum is the product of the mass of a body and the speed of the center of gravity thereof and therefore, where the movement time is constant, the momentum is represented by the product of the inertial mass of the body and the distance of movement thereof. Thus, if the mass of the counterweight is made great, the substantial distance over which the counterweight is lowered during the time that the mirror is moved up to its retracted position can be made small.

The mirror and the counterweight are displaced by an interlocking member in synchronism with each other and the direction of displacement of the counterweight is substantially opposite to the direction of displacement of the mirror. In a preferred embodiment of the present invention, when the mirror is in the observation position, the counterweight is moved up to a position proximate to the fore end position of the mirror and intercepts a light beam passing between the mirror and the bottom of the mirror chamber and travelling toward shutter blades. Therefore, in a focal plane shutter comprised of a plurality of blades, the leak light from between the overlapping blades is intercepted in advance by the counterweight.

DESCRIPTION OF THE PREFERRED EMBODIMENTS

A first embodiment of the present invention will hereinafter be described by reference to FIGS. 1 to 5.

Figure 2:
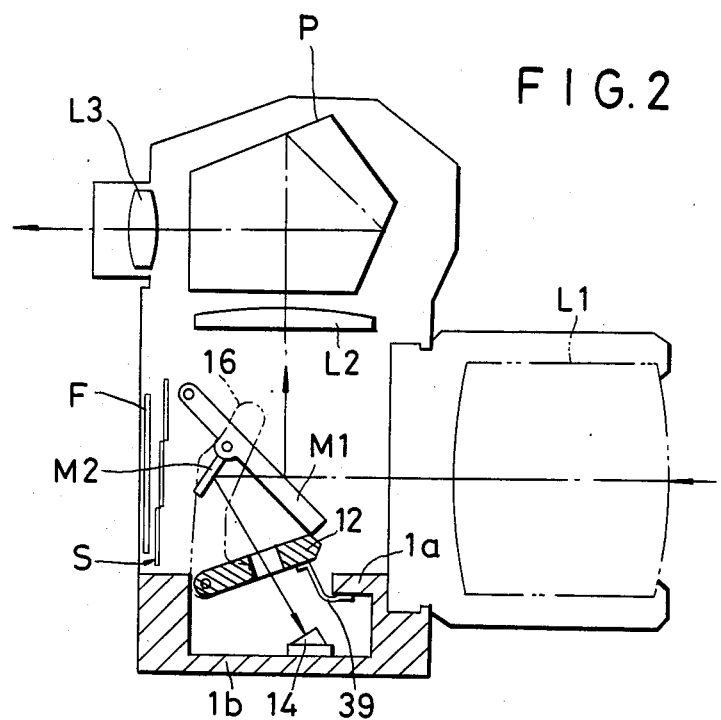
FIGS. 2 and 3 are longitudinal cross-sectional views of a camera into which the embodiment of FIG. 1 is incorporated, FIG. 2 showing the state when a mirror is in the observation position, and FIG. 3 showing the state when the mirror has been moved up to its retracted position.
Figure 3:
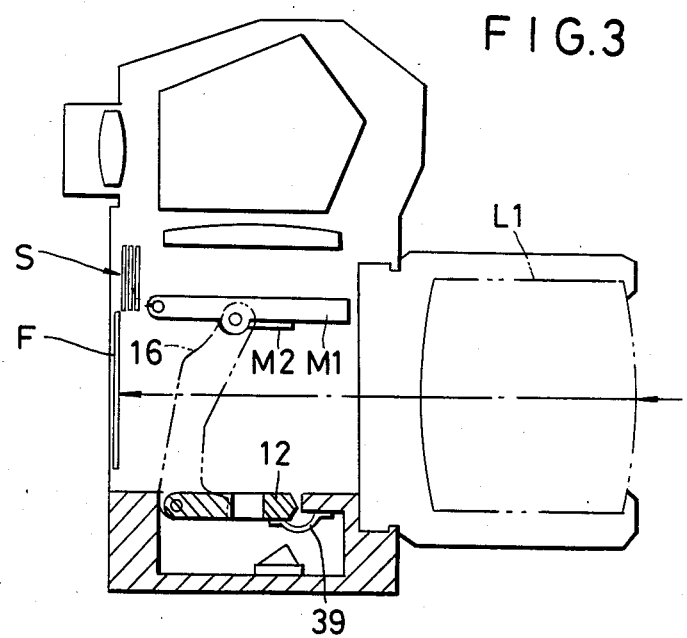

Referring to FIG. 2, part of the light transmitted through a photo-taking lens L1 is reflected by a mirror M1 having a half-transmitting portion at the center thereof, and arrives at the lower surface of a condenser lens L2, and the image of an object to be photographed is formed thereon. The image is observed through a pentaroof prism P and an eyepiece L3. Also, some light passed through the half-transmitting portion of the mirror M1 is downwardly reflected by a sub mirror M2, passes through a transmitting window provided in a counterweight 12 which will later be described in detail, and is received by a photosensor 14 securely provided in a bottom chamber provided between the bottom wall 1a of a mirror chamber and the bottom wall 1b of a camera body. The photoelectrically converted output of the photosensor 14 is transmitted to a conventional exposure control device and/or an automatic focus adjusting device. Also, the design is such that when the mirror M1 is raised to a retracted position as shown in FIG. 3, the sub mirror M2 is retracted out of the photo-taking optical path in operative association with the mirror M1. A shutter S is provided in front of a film F.

Figure 1:
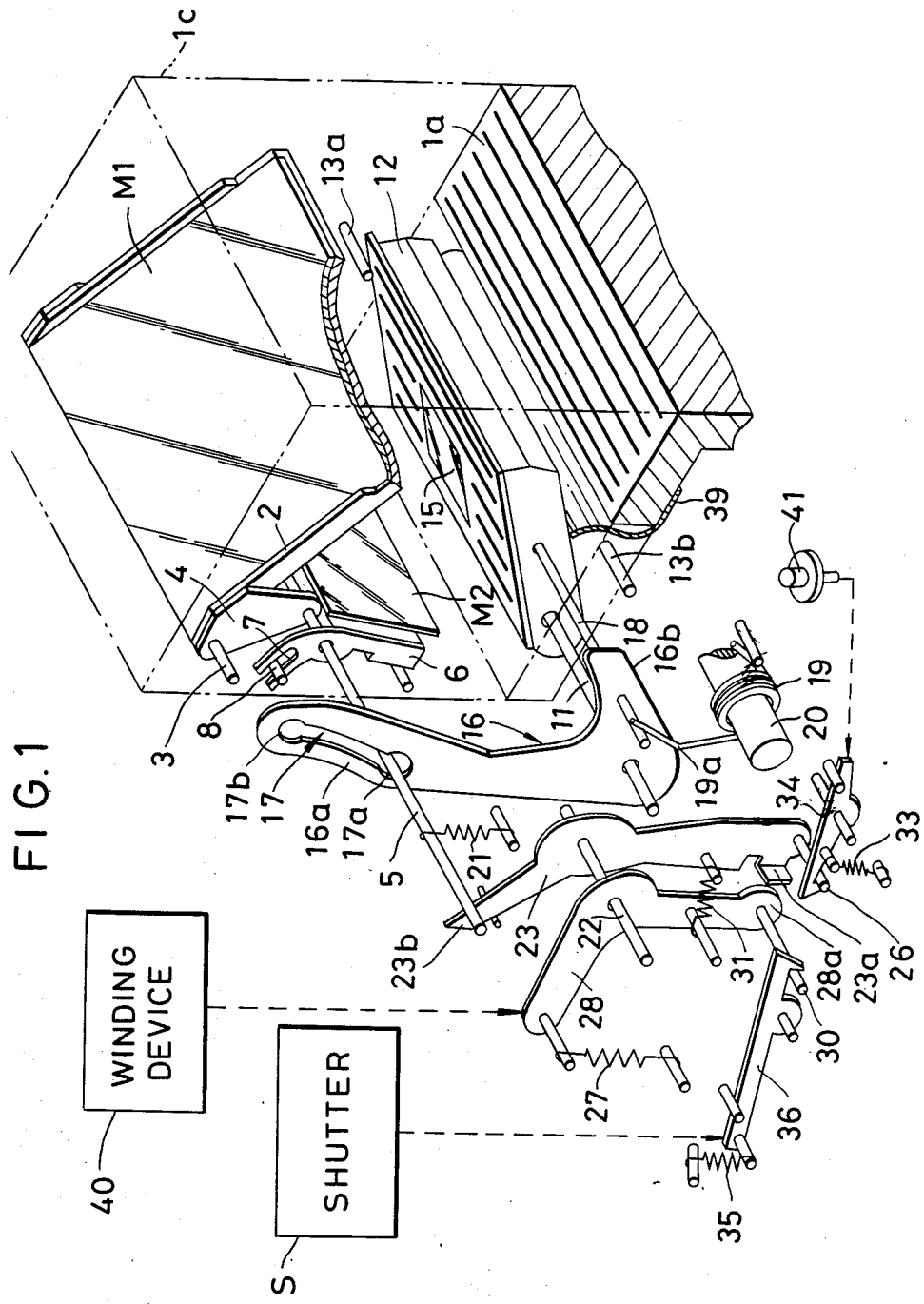
FIG. 1 is a perspective view showing a first embodiment of the present invention.

Referring to FIG. 1, the mirror M1 is contained in a mirror chamber 1c indicated by phantom lines and is held by a holding frame 2. This holding frame 2 is pivotally supported by pin shafts 3 studded in the opposite side walls of the mirror chamber. A support arm 4 is secured to each side surface of the holding frame 2, and a driving pin 5 is secured to one end of the support arm 4. The sub mirror M2 is secured to a support plate 6 rotatably supported on the driving pin 5.

The cam groove 7 of the support plate 6 is engaged with a fixed pin 8 studded in the camera body.

A counterweight 12 rotatably supported by a pin shaft 11 is provided at the bottom of the mirror chamber. This counterweight 12 is operatively associated with the mirror M1 through an interlocking lever 16 so that when the mirror M1 is in an observation position, the counterweight 12 is engaged with a limit pin 13a and when the mirror M1 is raised to its retracted position, the counterweight 12 lowers until it bears against a limit pin 13b, thereby forming a part of the bottom wall of the mirror chamber. Like the bottom wall 1a, the upper surface of the counterweight 12 is subjected to antireflection treatment.

A light-transmitting window 15 for passing therethrough a photometering light beam reflected by the sub mirror and arriving at the photosensor 14 is provided substantially in the central portion of the counterweight 12.

The pin shaft 11 further rotatably supports the interlocking lever 16. A slot cam 17 engaged with the driving pin 5 is provided in the arm 16a of the interlocking lever 16 and, when the driving pin 5 pivots counter-clockwise about the pin shaft 3 with the mirror M1, the interlocking lever 16 pivots clockwise about the pin shaft 11 in response to the pivotal movement of the driving pin 5. A connecting pin 18 is secured to the other arm 16b of the lever 16, and one end of this connecting pin 18 is coupled to the counterweight 12 and the other end thereof is engaged with a coil spring 19 supported on a fixed shaft 20.

Figure 4:
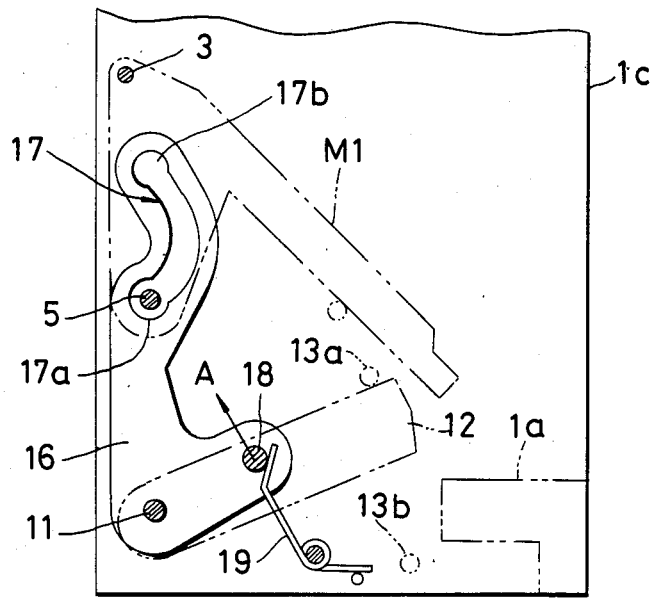
FIGS. 4 and 5 are side views for illustrating the relation among the mirror of FIG. 1, a counterweight and an interlocking lever, FIG. 4 showing the state when the mirror is in the observation position, and FIG. 5 showing the state when the mirror is in its retracted position.

Circular holes 17a and 17b larger than the diameter of the driving pin 5 are formed at the opposite ends of the slot cam 17 provided in the interlocking level 16. The coil spring 19 has a bent portion 19a and, when the connecting pin 18 is engaged with the fore end of this bent portion 19a, the coil spring 19 biases the interlocking lever 16 counter-clockwise as shown in FIG. 4, thereby causing the counterweight 12 to bear against the limit pin 13a through the connection pin 18.

On the other hand, the driving pin 5 is downwardly biased by a spring 21 and is engaged with one arm 23b of a lever 23 rotatably supported on a fixed shaft 22. A hook 23a is provided on the other arm of the lever 23.

A lever 28 normally biased counter-clockwise by a spring 27 is rotatably supported on the fixed shaft 22. One end portion 28a of the lever 28 is formed so as to be engageable with the hook 23a of the lever 23. The levers 23 and 28 are connected together through a spring 31.

The lever 23 is held through a pin 26 by a hook member 34 biased counter-clockwise by a spring 33. The lever 28 is held through a pin 30 by a hook member 36 biased clockwise by a spring 35.

A packing 39 formed of an elastic material is provided on the back of the bottom wall 1a of the mirror chamber. The fore end of this packing 39 is always in contact with the counterweight 12 to close the gap created between the bottom wall 1a and the counterweight 12, thereby preventing dust or the like from entering the bottom chamber of the camera through this portion.

The lever 28 pivots clockwise in response to the winding operation of the film and shutter winding device 40 of the camera to thereby charge the spring 27. Further, the hook member 34 is pivoted clockwise by the depressing operation of a release button 41 to liberate the pin 26, and the hook member 36 is operatively associated with a shutter S, and pivots counter-clockwise at the end of the exposure of the film to liberate the pin 30.

The biasing force of the spring 31 is stronger than the biasing force of the spring 21, and the coil spring 19 is designed to have a biasing force weaker than the biasing force of the spring 21 and greater than the weight of the counterweight 12. The spring 27 is designed to have a biasing force stronger than the biasing force of the spring 33.

Operation of the first embodiment will now be described.

FIG. 1 shows a state in which the springs 27 and 31 have been charged and the preparation for photography has been completed. When the release button 41 is depressed, the hook member 34 pivots clockwise to release the restraint of the pin 26 and liberate the lever 23. The lever 23 is pivoted clockwise by the biasing force of the spring 31, and the arm 23b causes the driving pin 5 to turn counter-clockwise about the pin shaft 3.

Figure 5:
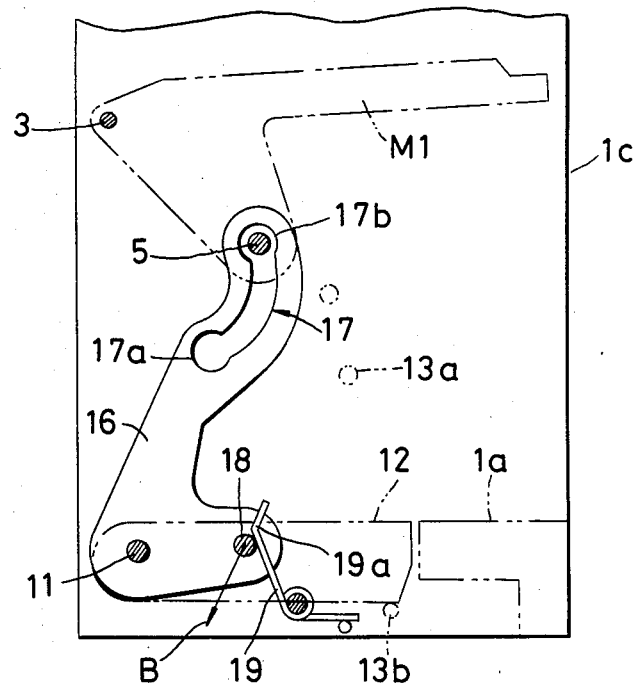

By this turning movement of the driving pin 5, the mirror M1 is moved up from the observation position shown in FIGS. 2 and 4 to the retracted position shown in FIGS. 3 and 5 and stops at the latter position. Also, with this upward movement of the mirror M1, the support plate 6 supported by the driving pin 5 is moved up. Accordingly, the sub mirror M2 is moved to a position substantially parallel to the back of the mirror M1 and is retracted out of the photo-taking optical path and at the same time, shields the central half-transmitting portion of the mirror M1.

The driving pin 5 comes out of the circular hole 17a of the interlocking lever 16 during its rotation about the pin shaft 3 and slides in the intermediate portion of the slot cam 17 and moves until it enters the circular hole 17b at the upper end of the slot cam. In the meantime, the interlocking lever 16 pivots clockwise about the pin shaft 11 in accordance with the slot cam 17, and the connecting pin 18 causes the counterweight 12 to pivot clockwise about the pin shaft 11. The pin 18 biased in the direction of arrow A by the spring 19 in FIG. 4 is biased in the direction of arrow B in FIG. 5 and the counterweight 12 positively bears against the limit pin 13b.

In this state of FIG. 5, the driving pin 5 is in the circular hole 17b of the cam 17 and therefore, the interlocking lever 16 can freely pivot by an amount corresponding to the gap created between the hole 17b and the driving pin 5.

In this case, the upper surface of the counterweight 12 is flush with the upper surface of the bottom wall 1a of the mirror chamber, as shown in FIGS. 3 and 5, and forms a part of the bottom wall of the mirror chamber.

When the mirror M1 is retracted out of the photo-taking optical path with the sub mirror M2 and the counterweight 12, the shutter S is operated by a known operation and the exposure of the film is effected. In response to the termination of the exposure operation, the hook member 36 pivots counter-clockwise against the biasing force of the spring 35 to release the restraint of the pin 30 and liberate the lever 28. The lever 28 pivots counter-clockwise and causes the lever 23 to pivot counter-clockwise through the end portion 28a and the bent portion 23a until the arm 23b bears against a limit pin. In the meantime, the pin 26 of the lever 23 is restrained by the hook member 34.

Also, the driving pin 5 follows the lever 23 and pivots clockwise to return the mirror M1 from the retracted position of FIG. 5 to the observation position of FIG. 4. At the same time, it returns the sub mirror M2 to a predetermined position on the photo-taking optical path.

On the other hand, the interlocking lever 16 pivots counter-clockwise about the pin shaft 11 in accordance with the cam 17 and pivots the counterweight 12 counter-clockwise through the connecting pin 18. The connecting pin 18 is biased clockwise by the coil spring 19 at the initial stage of its pivotal movement and thus pivots counter-clockwise against this biasing force. However, when the connecting pin 18 comes into contact with the fore end of the coil spring 19 beyond the bent portion 19a thereof, the connecting pin 18 is biased counter-clockwise.

When the downward movement of the mirror M2 is stopped, the driving pin 5 also is stopped. At this time, the driving pin 5 is inserted into the hole 17a at the lower end of the cam 17. Accordingly, the interlocking lever 16 becomes freely displaceable by an amount corresponding to the gap between the driving pin 5 and the hole 17a, and the mirror M1 and the counterweight 12 do not interfere with each other but bear against the limit pins and are stopped thereby. At this time, the coil spring 19 positively urges the counterweight 12 against the limit pin 13a through the interlocking pin 18.

When the series of photographing operations as described above are terminated, the winding device 40 is operated to move the lever 28 to the position of FIG. 1 and charge the springs 27 and 31 at the same time.

Figure 6:
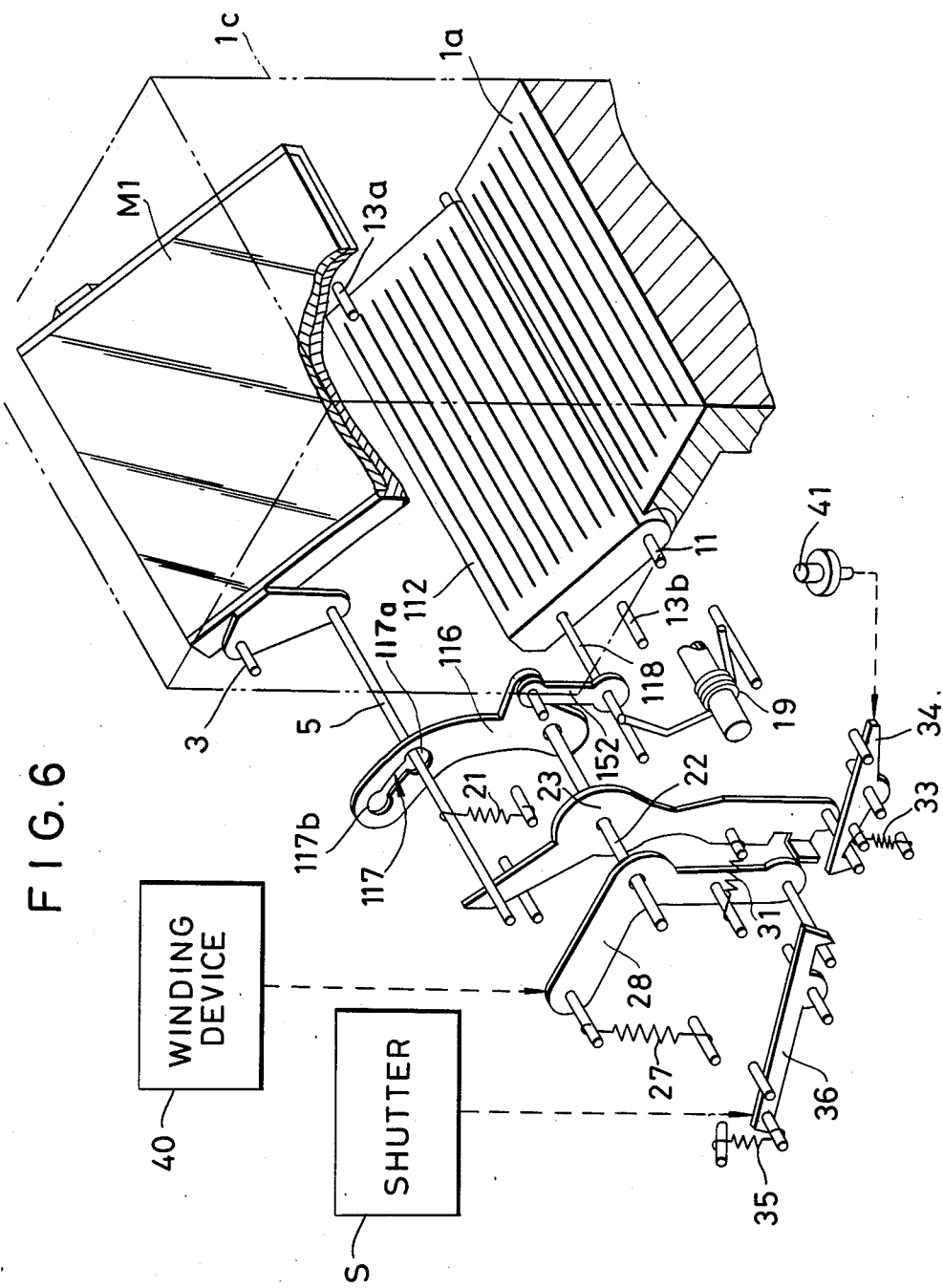
FIG. 6 is a perspective view showing a second embodiment of the present invention.

FIG. 6 shows a second embodiment of the present invention used in a single lens reflex camera having no sub mirror. A counterweight 112 is pivotally supported on a pin shaft 11 studded in the mirror chamber 1c. An interlocking lever 116 having a slot cam 117 engaged with the driving pin 5 for rotating the mirror M1 about the pin shaft 3 is rotatably supported on a fixed shaft 22 rotatably supporting levers 23 and 28. As in the first embodiment, the slot cam 117 has circular holes 117a and 117b at the opposite ends thereof, and the driving pin 5 slides in the intermediate portion of the slot cam.

The interlocking lever 116 is coupled to the connecting pin 118 by a connecting rod 152. The counterweight 112 is inclined in a direction substantially parallel to the mirror M1 when it bears against the limit pin 13a, and the upper surface of the bottom wall 1a of the mirror chamber and the upper surface of the counterweight 112 are coincident with each other when the counterweight 112 bears against the limit pin 13b.

The interlocking lever 116, the connecting rod 152 and the counterweight 112 together constitute a four-mode link mechanism, and when the interlocking lever 116 pivots clockwise in response to the upward movement of the mirror M1, the counterweight 112 pivots counter-clockwise and lowers.

When the release button 41 is depressed, the hook member 34 pivots clockwise and the lever 23 rotates clockwise. Accordingly, the driving pin 5 moves the mirror M1 upwardly.

During this upward movement of the mirror M1, the driving pin 5 moves from the hole 117a of the cam 117 to the hole 117b thereof. During that time, the interlocking lever 116 moves clockwise about the fixed shaft 22 in accordance with the cam 117. This clockwise pivotal movement of the interlocking lever 116 is transmitted to the counterweight 112 through the connecting rod 152 and connecting pin 118, and the counterweight 112 pivots counter-clockwise against the biasing force of the coil spring 19 and positively bears against the limit pin 13b.

When the mirror M1 reaches its retracted position, the shutter S is operated to effect exposure and subsequently, the retention of the lever 28 by the hook member 36 is released. Accordingly, the levers 28 and 23 pivot and the driving pin 5 moves the mirror M1 down to the observation position.

When the driving pin 5 turns clockwise, the interlocking lever 116 pivots counter-clockwise about the fixed shaft in accordance with the cam 117 and returns the counterweight 112 to its original position shown in FIG. 6 through the connecting rod 152 and connecting pin 118.

In the second embodiment described above, the direction of rotation of the counterweight 112 is the same as the direction of rotation of the mirror M1. Vertically, however, the counterweight 112 moves in the direction opposite to the direction of movement of the mirror M1 as in the first embodiment and therefore, the shock absorbing effect thereof is entirely the same as that in the first embodiment.

If, in the first and second embodiments, the limit pins for receiving the mirror and counterweight which have returned to the observation position are designed to have an elastic characteristic, the shock resulting from the stoppage of the mirror and counterweight can be alleviated and at the same time, the shock sound can be decreased.

Figure 7:
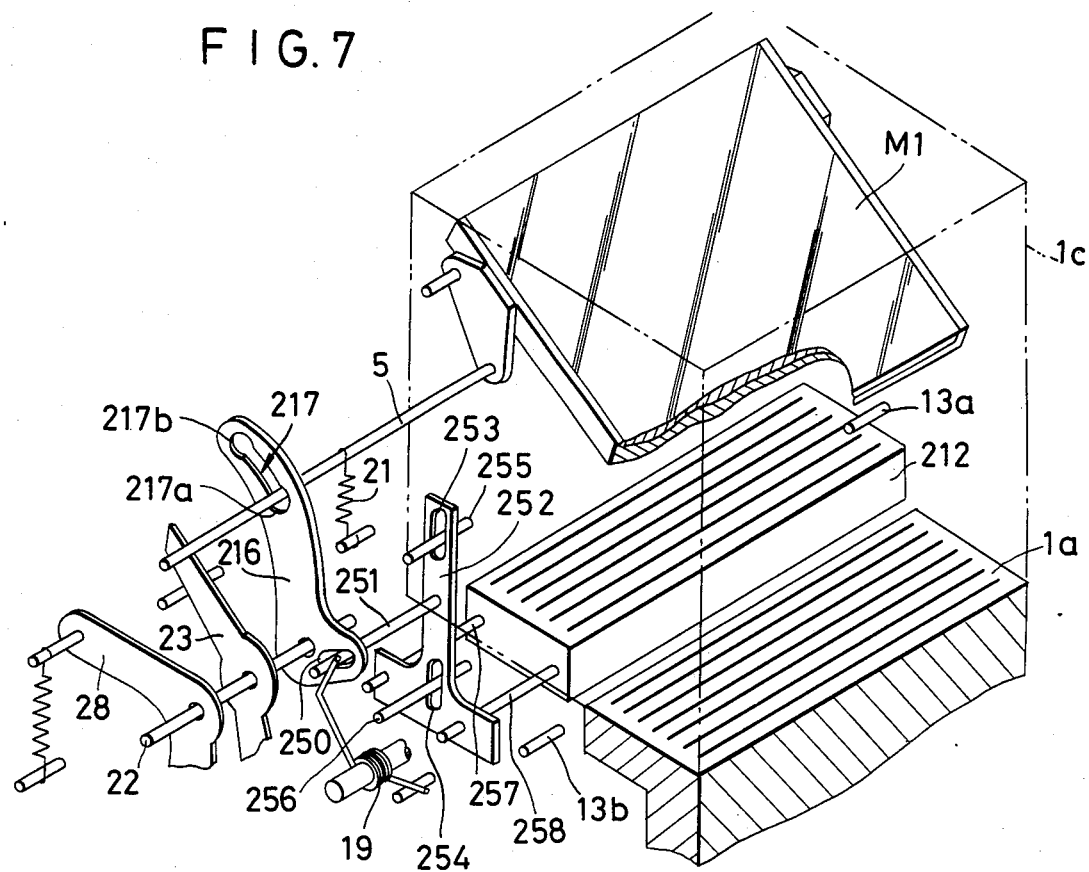
FIG. 7 is a perspective view showing a third embodiment of the present invention.

FIG. 7 shows a third embodiment in which the counterweight is designed to be vertically parallel-moved. An interlocking lever 216 rotatably supported by the fixed shaft 22 supporting the levers 23 and 28 is provided with a slot cam 217 engaged by the driving pin 5 and a straight slot cam 250 engaged by a sliding pin 251. The sliding pin 251 is secured to a T-shaped guide plate 252. Two vertically extending guide slots 253 and 254 are formed in the vertically extending arm of the guide plate 252, and fixed pins 255 and 256 are slidably inserted in the guide slots 253 and 254, respectively, so as to slidably guide the guide plate.

Coupling pins 257 and 258 are secured to the horizontally extending arm of the guide plate 252, and the counterweight 212 is supported by these two coupling pins 257 and 258 so that the upper surface of the counterweight 212 is parallel to the upper surface of the bottom wall 1a of the mirror chamber 1c. Accordingly, the counterweight 212 is vertically parallel-moved while being guided by the vertically extending slots 253 and 254 of the guide plate 252, and the upward movement thereof is limited by the limit pin 13a, and the downward movement thereof is also limited by the limit pin 13b when the upper surface of the counterweight 212 has become flush with the upper surface of the bottom wall 1a.

When the release button is depressed, as in the first embodiment, the lever 23 pivots the driving pin 5 counter-clockwise with the mirror M1, and moves the mirror M1 to its retracted position. At that time, the driving pin 5 pivots the interlocking lever 216 clockwise in accordance with the cam 217. This pivotal movement of the interlocking lever 216 moves the counterweight 212 downwardly through the intermediary of the sliding pin 251 and guide plate 252 while keeping the counterweight horizontal, and when the mirror M1 has been moved to its retracted position, the counterweight 212 bears against the limit pin 13b and forms a part of the bottom wall 1a of the mirror chamber. At that time, the driving pin 5 is in the hole 217b and therefore, the mirror M1 and counterweight 212 stop at their respective predetermined retracted positions without interfering with each other. The driving pin 5 returns the mirror M1 to the observation position. Also, the interlocking lever 216 is pivoted counter-clockwise by the driving pin 5, and the counterweight 212 is moved upwardly through the intermediary of the sliding pin 251 and guide plate 252 and bears against the limit pin 13a as shown in FIG. 7.

Again in the second and third embodiments, it is preferable that the gap created between the counterweight and the bottom plate 1a be hermetically sealed by a packing 39 as in the first embodiment.

We claim:

1. A camera comprising:
   a camera housing;
   a mirror member provided between a photo-taking lens and a focal plane thereof and having a reflecting surface and a pivot axis provided at one end of said reflecting surface in parallelism to the focal plane, said mirror member being movable between an observation position in which said reflecting surface intersects an optic axis of said photo-taking lens and a retracted position in which said reflecting surface is retracted from said optic axis, by the pivotal movement of said reflecting surface about said pivot axis;
   a finder screen member receiving light passed through said photo-taking lens and reflected by said reflecting surface when said mirror member is in said observation position;
   a mirror chamber in said camera housing containing said mirror member therein, said mirror chamber having a movable wall member movable between a wall position in which said movable wall member is disposed opposite to said finder screen member in relation to said optic axis along a bottom plane of said mirror chamber parallel to both said pivot axis and said optic axis and in which said movable wall member constitutes at least part of a bottom wall of said mirror chamber, and a non-wall position in which said movable wall member is shifted from said wall position toward said finder screen member, said movable wall member having a mass greater than the mass of said mirror member; and
   drive means for moving said mirror member and said movable wall member at the same time so that the center of gravity of said movable wall member moves in a direction substantially opposite to the direction of the movement of the center of gravity of said mirror member, and wherein the distance of movement of the center of gravity of said movable wall member is smaller than the distance of movement of the center of gravity of said mirror member.

2. A camera according to claim 1, wherein said movable wall member is formed so that a momentum of said movable wall member moved by said drive means matches a momentum of said mirror member moved by said drive means.

3. A camera according to claim 1, further comprising light receiving means provided in a space formed below said bottom wall of the mirror chamber, and wherein said mirror member includes means for directing a part of the light from said photo-taking lens to said bottom wall, and said movable wall member has a light transmitting window for passing therethrough light from said mirror member to said light receiving means.

4. A camera according to claim 1, wherein said movable wall member is disposed in a space surrounded by said mirror member, said focal plane and said bottom plane when said mirror member is moved to said observation position.

5. A camera according to claim 4, wherein said movable wall member is supported so as to be moved by said drive means about a pivot axis parallel to said pivot axis of said mirror member.

6. A camera according to claim 5, wherein said pivot axis of the movable wall member is disposed at one end of said movable wall member adjacent to said focal plane.

7. A camera according to claim 5, wherein said pivot axis of the movable wall member is disposed at one end of said movable wall member adjacent to said photo-taking lens.

8. A camera according to claim 4, wherein said drive means includes a support member for holding said movable wall member and displacing said movable wall member in a direction perpendicular to both of said pivot axis and said optic axis.

9. A camera according to claim 1, further comprising biasing means acting on said movable wall member to urge the centers of gravity of said movable wall member and said mirror member toward each other when said mirror member is in said observation position and to urge said centers of gravity away from each other when said mirror member is in said retracted position.

10. A camera according to claim 1, wherein said drive means includes a driving member coupled to said mirror member and pivotable about said pivot axis for movement of said mirror member, an interlocking member coupled to said movable wall member, and cam means provided between said driving member and said interlocking member to displace said interlocking member in response to said driving member.

11. A camera comprising:
a camera housing;
a mirror member provided between a photo-taking lens and a focal plane thereof and having a reflecting surface and a pivot axis provided at one end of said reflecting surface in parallelism to the focal plane, said mirror member being movable between an observation position in which said reflecting surface intersects an optic axis of said photo-taking lens and a retracted position in which said reflecting surface is retracted from said optic axis, by the pivotal movement of said reflecting surface about said pivot axis;
a finder screen member receiving light passed through said photo-taking lens and reflected by said reflecting surface when said mirror member is in said observation position;
a mirror chamber in said camera housing containing said mirror member therein, said mirror chamber having a bottom wall member positioned opposite to said finder screen member in relation to said optic axis and forming at least part of a bottom wall of said chamber;
said bottom wall member having a wall surface facing into said chamber and being movable between a wall position in which said wall surface is substantially coincident with a bottom plane of said mirror chamber parallel to both said pivot axis and said optic axis and a non-wall position in which said bottom wall member is shifted from said wall position toward said finder screen member; and
drive means for moving said mirror member and said bottom wall member at the same time so that said bottom wall member moves from said non-wall position to said wall position during the movement of said mirror member from said observation position to said retracted position, and so that said bottom wall member intercepts light passing from said photo-taking lens between said mirror member and said bottom plane when said mirror member is moved to said observation position.

12. A camera according to claim 11, wherein said bottom wall member is supported so as to be moved by said drive means about a pivot axis parallel to said pivot axis of said mirror member, said pivot axis of said bottom wall member being disposed at one end of said bottom wall member adjacent to said focal plane.

* * * * *